United States Patent
Ramsay

[15] 3,692,407
[45] Sept. 19, 1972

[54] METHOD AND APPARATUS FOR MAKING AERIAL SURVEY PHOTOGRAPHS SCALE

[72] Inventor: Morris Ramsay, 125 N. Main St., Greensburg, Pa. 15601

[22] Filed: Dec. 17, 1970

[21] Appl. No.: 99,323

Related U.S. Application Data

[63] Continuation of Ser. No. 2,739, Jan. 14, 1970, abandoned.

[52] U.S. Cl. .........................355/52, 353/70, 355/45, 355/72, 355/75
[51] Int. Cl. .............................................G03l 27/68
[58] Field of Search ........353/69, 70; 355/52, 45, 72, 355/74, 75

[56] References Cited

UNITED STATES PATENTS

| | | | |
|---|---|---|---|
| 3,142,223 | 7/1964 | Vetter | 355/45 X |
| 1,946,810 | 3/1934 | Rowell | 355/75 |
| 1,457,209 | 5/1923 | Chanier | 355/52 X |
| 2,565,446 | 8/1951 | Abbott | 355/72 X |

Primary Examiner—Samuel S. Matthews
Assistant Examiner—E. M. Bero
Attorney—Buell, Blenko & Ziesenheim

[57] ABSTRACT

The method of making an aerial survey photograph of a geographical area to scale and apparatus for use in said method. A plotting is made on a template, preferably positioned on an easel, at a given scale of the correct relative locations of key points of a geographical area. An image of an out of scale aerial survey photograph of said area showing said key points is projected onto a flexible reflective surface, preferably a mirror, which in turn reflects said image onto the template. The flexible reflective surface is manipulated, preferably by deforming the mirror by certain provided means, until the key points of said image registers with the corresponding key points on the template. The projection is then stopped, an unexposed photographic film placed at the template location, and the projection resumed, thereby making an inscale photograph at the same scale as the template of the geographical area.

17 Claims, 9 Drawing Figures

INVENTOR.
MORRIS RAMSAY
BY
Brown, Murray,
Flick & Peckham
ATTORNEYS.

INVENTOR.
MORRIS RAMSAY
BY
Brown, Murray, Flick & Peckham
ATTORNEYS.

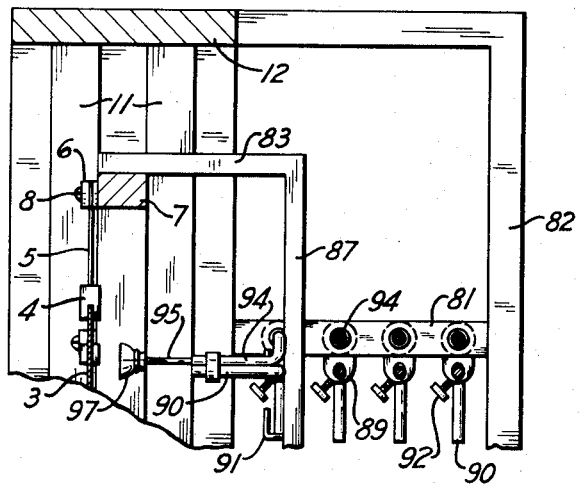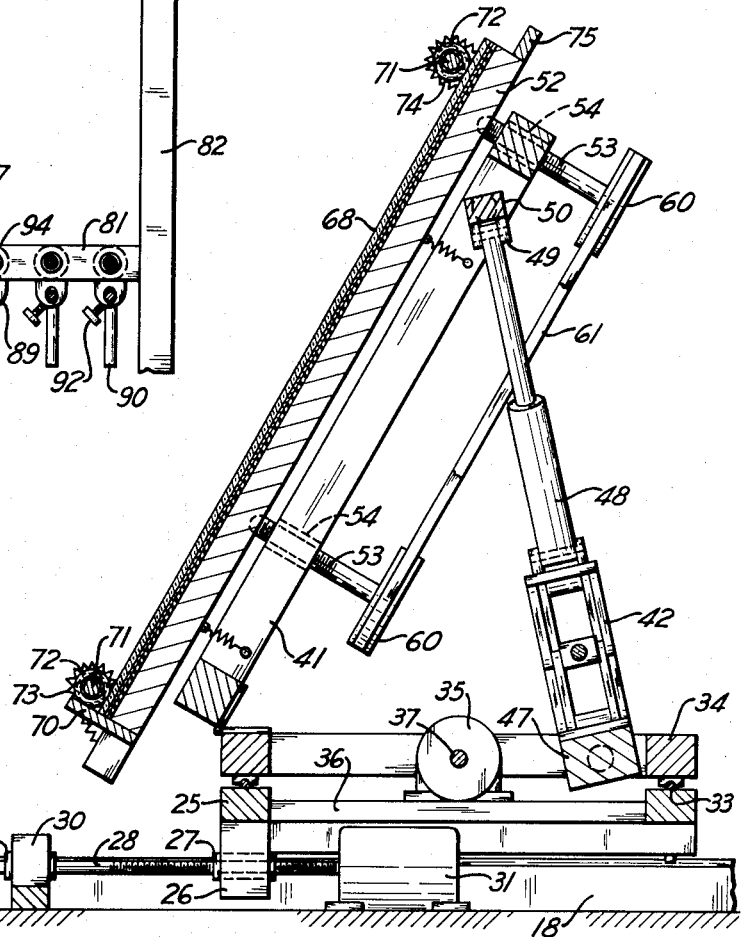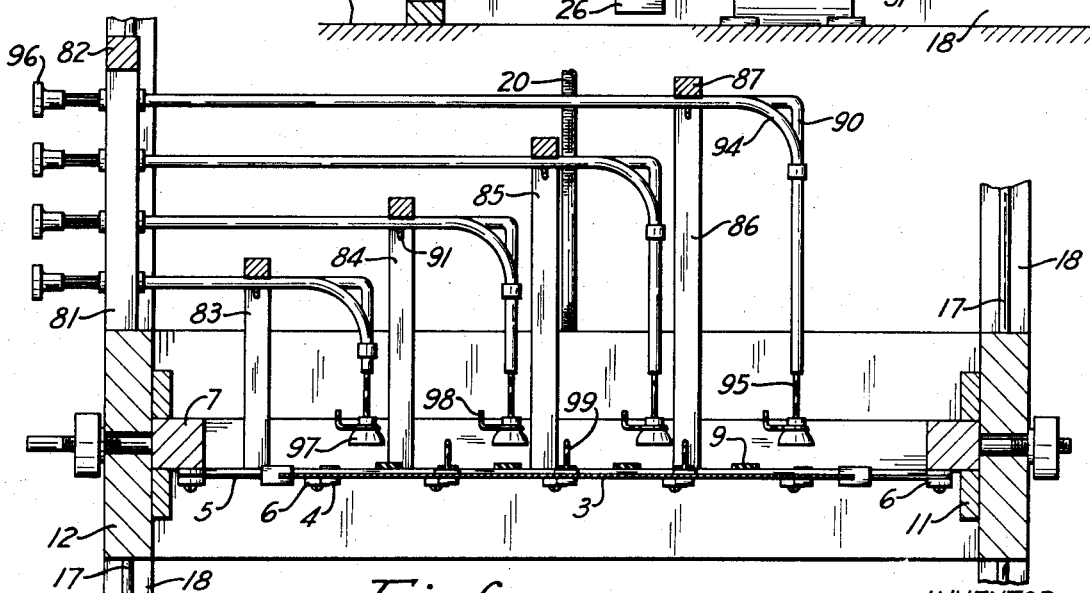

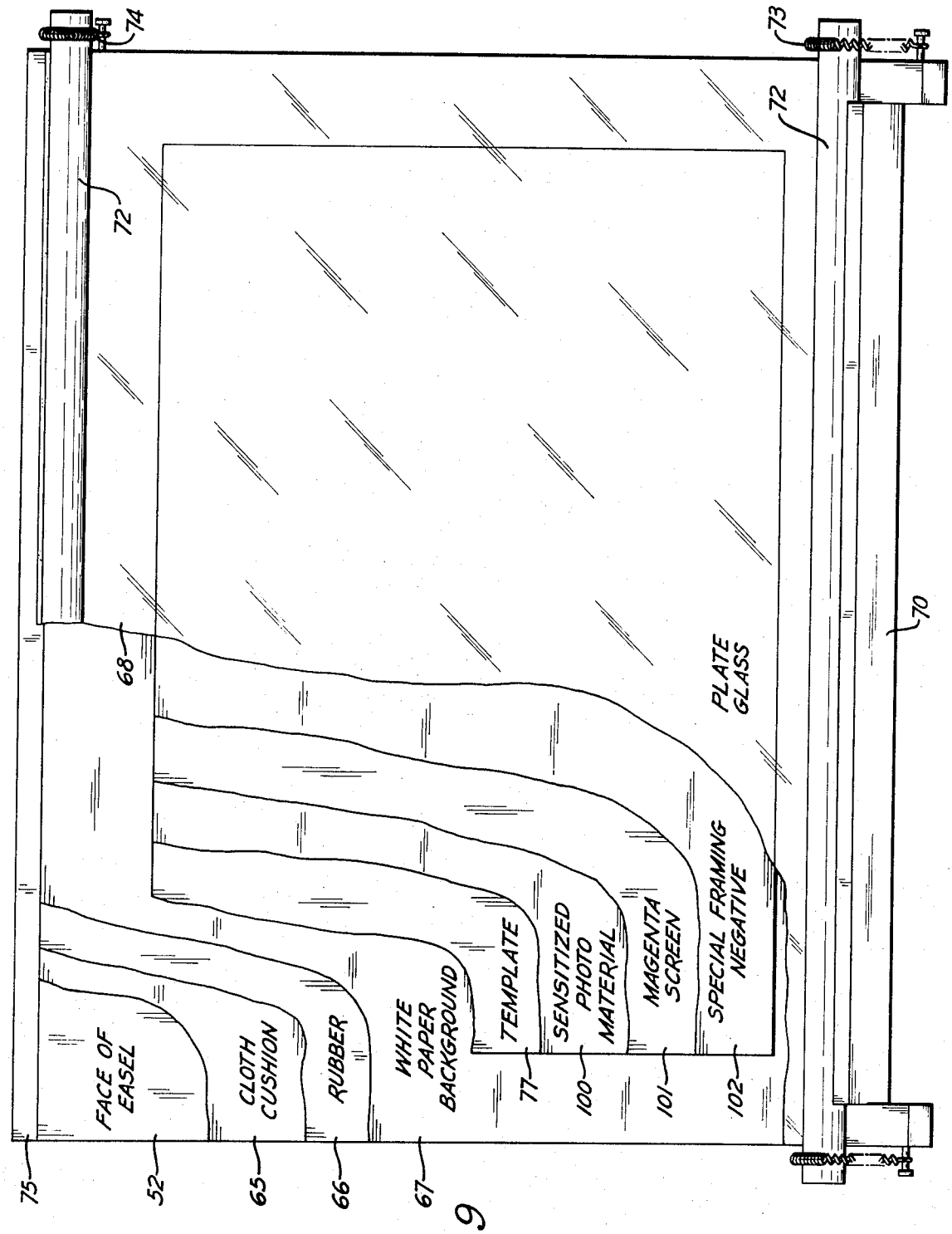

ic work and in accurately representing large areas
METHOD AND APPARATUS FOR MAKING AERIAL SURVEY PHOTOGRAPHS SCALE This application is a continuation of co-pending application, Ser. No. 2,739, filed Jan. 14, 1970, now abandoned.

This application relates to precision photogrammetry. The invention is adapted to precision plotting of large areas in photographic form to scale without displacement. The invention is especially useful in topographic work and in accurately representing large areas in photographic form.

The development of maps, plans, and the like for various purposes is notoriously old. Traditionally, the work has been based on field surveys by which courses and distances are run by a survey crew and reduced to the form of field notes. The field notes are then transferred to a map or drawing intended as a faithful representation of the topography structure or the like being surveyed. Field notes are almost inevitably sketchy and the resultant map or plan can be no better. Moreover, field notes are often necessarily taken under adverse conditions, e.g., cold weather, adjacent highways or construction, in difficult terrain, or the like. Even in the absence of adverse conditions, there is a constant risk of error in taking of field notes. Such errors can only be corrected by rechecking in the field or by judicious amendment in preparing the map or plan based upon logic or intuition as to what the notes should have shown. If, Aerial photography has been extensively employed in mapping and survey work. It is well known, however, that aerial survey photographs are commonly distorted and out of scale especially when the terrain being surveyed is rolling, hilly, or mountainous. Distortion occurs in part because of the practical impossibility of maintaining the aircraft at precisely the intended altitude without yaw, pitch, or roll. The photographs are ordinarily taken at altitudes of several thousand feet above the terrain, and distortions introduced by the changes in elevation and altitude of the aircraft become significant for precise engineering work. Terrain appearing upon a rectangular negative will actually be trapezoidal in shape. Irregularities in the terrain are commonly present in the form of hills and valleys in which the surface is not at a datum plane. The photograph of the irregular three-dimensional terrain is necessarily reduced to a two-dimensional negative and print, and distortion in the form of relief displacement is inherent therein. Additionally, distortion is introduced by the fact that the photograph is taken from a point — the lens — from a finite distance. If for example, a camera is set up to photograph the facade of a building for architectural renovations, some of the above mentioned distortions can be eliminated. The camera can be precisely positioned on a tripod, and the facade is planar to all intents and purposes. Nevertheless the photograph will be distorted and not be to scale, and parallel surfaces will converge on the photograph to an imaginary vanishing point. In aerial photography such distortion commonly limits the useful area of a negative to the middle third of the negative.

It has previously been proposed to correct for distortions caused by misalignment of the camera by introducing a counter distortion during the printing process. The negative obtained by an aerial photograph is projected onto a template having certain key points located in thin correct positions by a ground survey. The template carrier, the projector, or both are then manipulated to change the angle and distances between them until the key points projected from the negative match the same points on the template as closely as possible. A sheet of printing paper or film is then placed on the template carrier exposed and then developed. While such a process will tend to correct for errors introduced by misalignment of the camera, errors and distortions resulting from changes in elevation of the terrain and of the convergence of parallel lines to a vanishing point, it will not correct for relief displacement. Other and elaborate schemes have been employed to compensate for and to overcome the latter distortions. Such efforts have required expensive apparatus, skilled operators and are slow. The overall cost is thereby high. In the Manual of Photogrammetry (3rd Ed., 1966) published by the American Society of Photogrammetry, Falls Church, Virginia, it is pointed out (vol. 5, p. 331) that the plotting machine is usually the bottleneck in photogrammetric plotting.

A common requirement of topographic surveying is for a wide variety of engineering work in which changes or additions are to be made to water lines, sewers, gas lines, power lines, roadways, and other structures. The size of the job and the necessity of avoiding unnecessary expenditures have made aerial surveys uneconomic and unfeasible. Moreover errors inherent in aerial mapping are intolerable for usual engineering work. Accordingly, it has been necessary to carry out field surveys and to reduce the field notes to the form of a map or other representation of the place being surveyed.

It is among the objects of this invention to provide a method and apparatus for making aerial survey and other photographs to scale, which produce photographs that are more accurate than heretofore, and which permit any desired area of the projected image to be adjusted relative to adjoining areas without disturbing the latter.

I prepare precision photographic reproduction by photographing an area, projecting the photograph against a reflecting surface and selectively deforming the reflecting surface. The image is reflected from the reflecting surface to an image surface. The deformations in the reflecting surface cause distortions in the photograph to be eliminated in the projection of the photograph onto the image surface. I prefer to provide a reflecting surface in the form of a flexible mirror which may be moved into a non-planar configuration. I prefer to provide manipulating means attachable to the reflecting surface at convenient points. I further prefer to provide an image surface in the form of an easel adapted to hold photographic materials. Preferably the easel is movable and tiltable whereby gross distortions in the photographic axis may be corrected by manipulation of the easel. I prefer to provide a flat, resilient cushion on the easel and to provide a rigid transparent member overlaying the cushion. Preferably I provide one sheet of glass which will hold one or more flat sheets in position upon the easel surface.

I prepare a template of an area being mapped locating on the template several key points which are fixed by a field survey. I project a photograph of the area onto the template and by manipulation of the easel and selective deformation of the reflective surface cause the key points projected from the photograph to coincide with the key points on the template. Thereafter a photographic material is placed in the same plane as the template and exposed to produce a photographic representation of the area which is suitably scaled.

The preferred embodiment of the invention is illustrated in the accompanying drawings, in which:

FIG. 6 is a horizontal section taken on the line VI—VI of FIG. 5;

FIG. 7 is a fragmentary vertical section taken on the line VII—VII of FIG. 3;

FIG. 8 is a vertical section taken on the line VIII—VIII of FIG. 4; and

FIG. 9 is a section of the front of the easel, with parts broken away.

Figure 3:
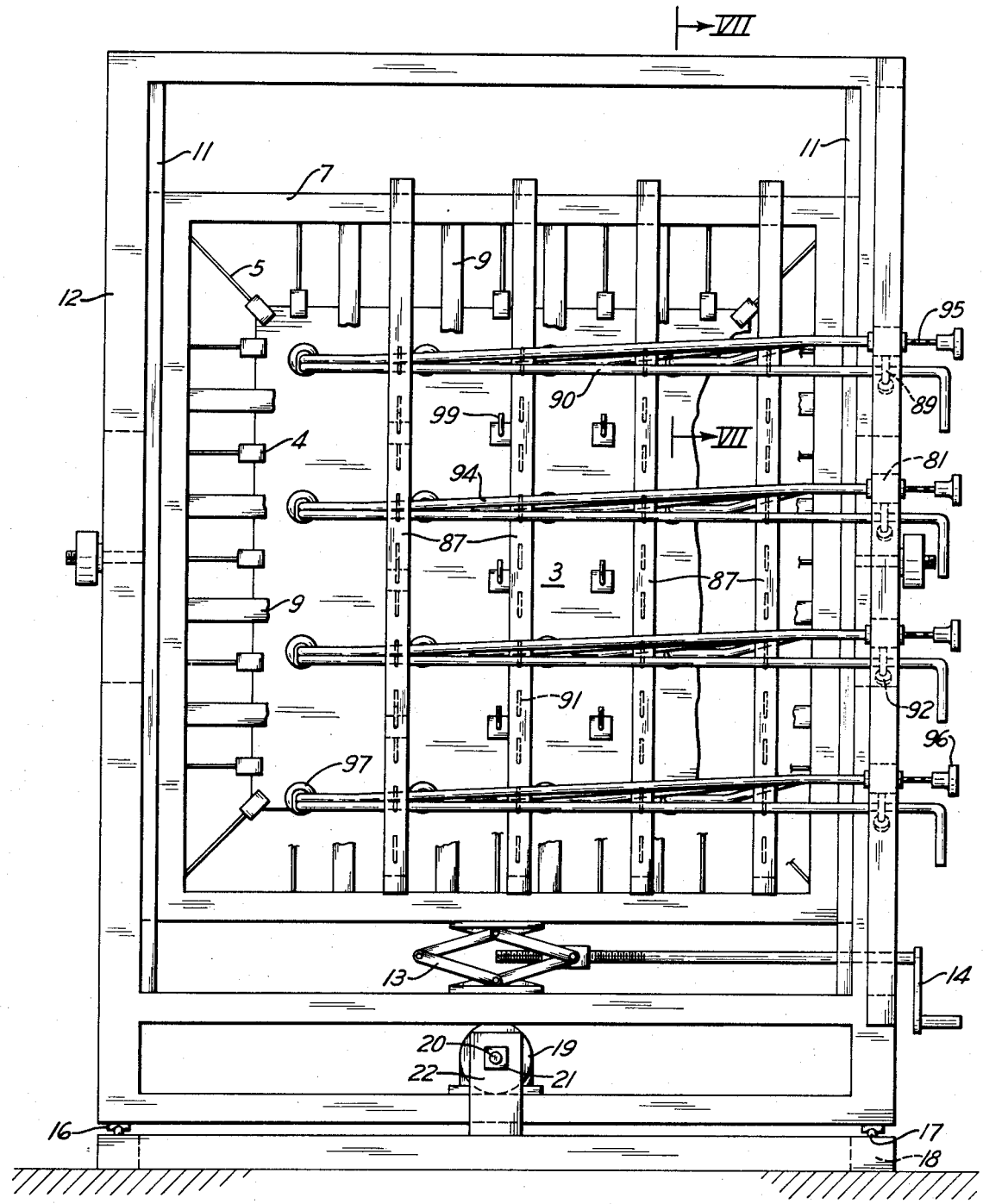
FIG. 3 is a view of the back of the mirror forming part of the apparatus of FIG. 1.
Figure 5:
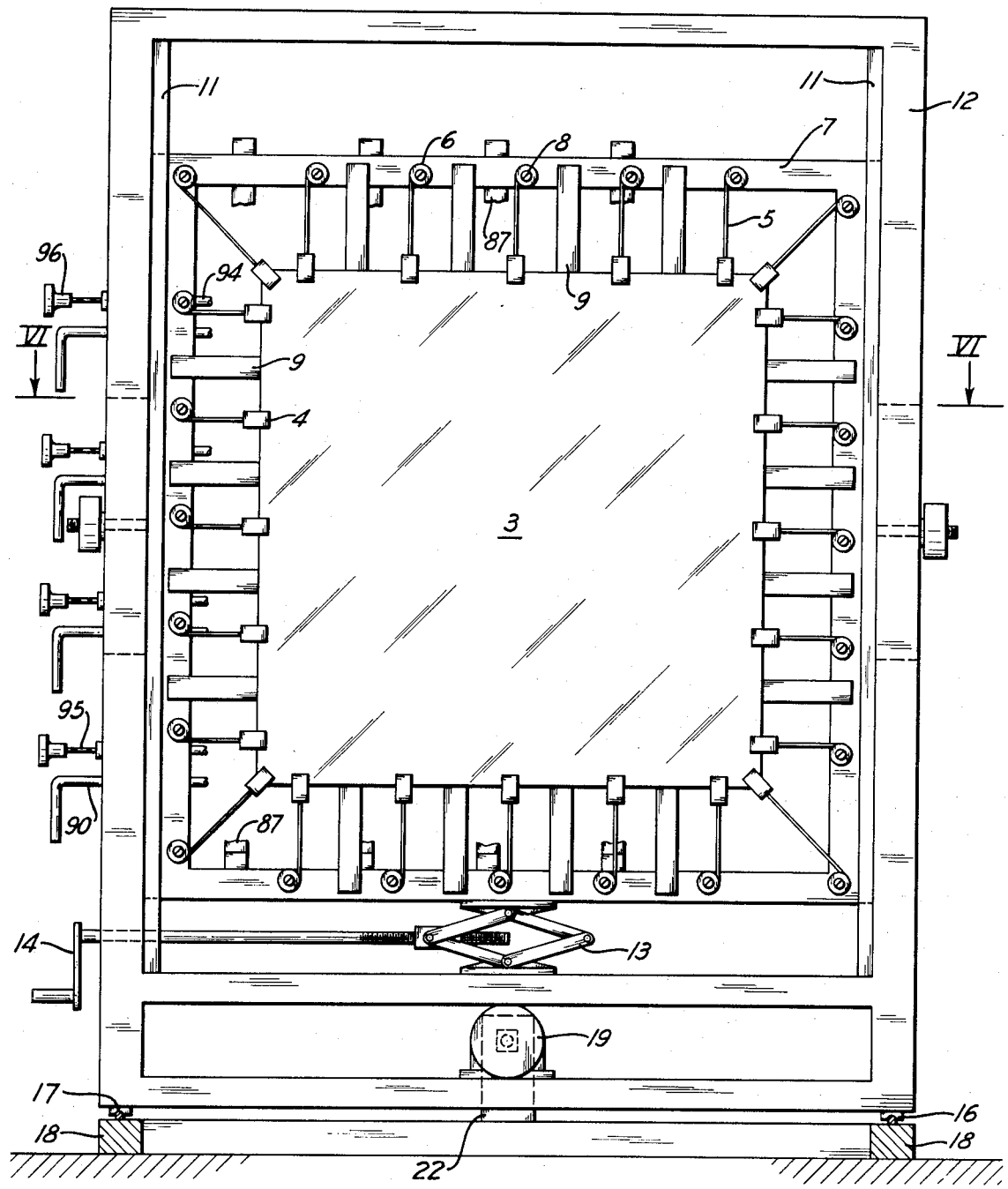
FIG. 5 is a view of the front of the mirror.

Referring to the drawings, a suitable projector 1 for an aerial survey photographic negative is adjustably mounted on a relatively tall stand 2 for projecting an image of the negative onto a vertical reflective surface. This surface is the normally flat surface of a flexible mirror 3 that can be formed from a strong deformable sheet, such as plastic, metal or the like, on which a reflective coating has been deposited in any suitable manner to produce a mirror surface. The mirror normally is held perfectly flat by stretchers attached to it around its edges, as shown in FIGS. 3 and 5. These stretchers are formed from clips 4 that are clamped on or glued to the margin of the mirror, and wires 5 or the like attached to the clips and wound on spools 6 that are secured to a surrounding rectangular frame 7 by means of screws 8. The spools are turned by hand to put tension on the mirror, and then the screws are tightened to prevent the spools from turning in the reverse direction. Vibration of the mirror can be prevented, in case that is a problem, by straps 9 extending vertically and horizontally across the frame, to which their ends are attached. The straps are under tension and engage the back of the mirror.

The mirror frame 7 is held in vertical guides 11 secured to the inside of a surrounding framework 12, from the top and bottom of which the mirror frame is spaced. It is supported in the framework by vertically adjustable means, such as a toggle link jack 13 that can be operated by a crank 14 extending out through the side of the framework. The framework itself is provided with concave feet 16 that fit over rod-like tracks 17 mounted on a pair of spaced parallel wooden rails 18 which extend toward the projector stand. To adjust framework 12 toward and away from the projector, a reversible electric motor 19 is mounted in the base of the framework and drives a long screw 20 that extends through a stationary nut 21 in a block 22 rigidly mounted between the rear ends of the wooden rails. It will therefore be seen that the mirror can be adjusted vertically and also toward and away from the projector.

Also slidably mounted on tracks 17 is a carriage 25 of an easel, as shown in FIGS. 1, 2, 4 and 8. The front of this carriage is provided centrally with a downwardly extending block 26, in which there is a stationary nut 27. A long horizontal screw 28 extends through this nut, with its front end rotatably mounted in a bearing 29 in a block 30 in front of the carriage. The rear end of the screw is connected to a stationary reversible motor 31 that can turn the screw to move the carriage toward and away from the mirror framework and the projector.

Mounted on top of the carriage are two spaced parallel tracks 33 that extend transversely of it and slidably support the base or bottom frame 34 of the easel so that it can be adjusted cross ways of the carriage by means of a gear and rack or by a reversible electric motor 35 supported on a cross member 36 connecting the centers of the front and back of the carriage. This motor turns a screw 37 that extends laterally through a stationary nut 38 in one side of the bottom frame. Consequently, the bottom frame not only can be moved toward and away from the mirror or projector by the carriage, but also parallel to the mirror or projector.

Figure 1:
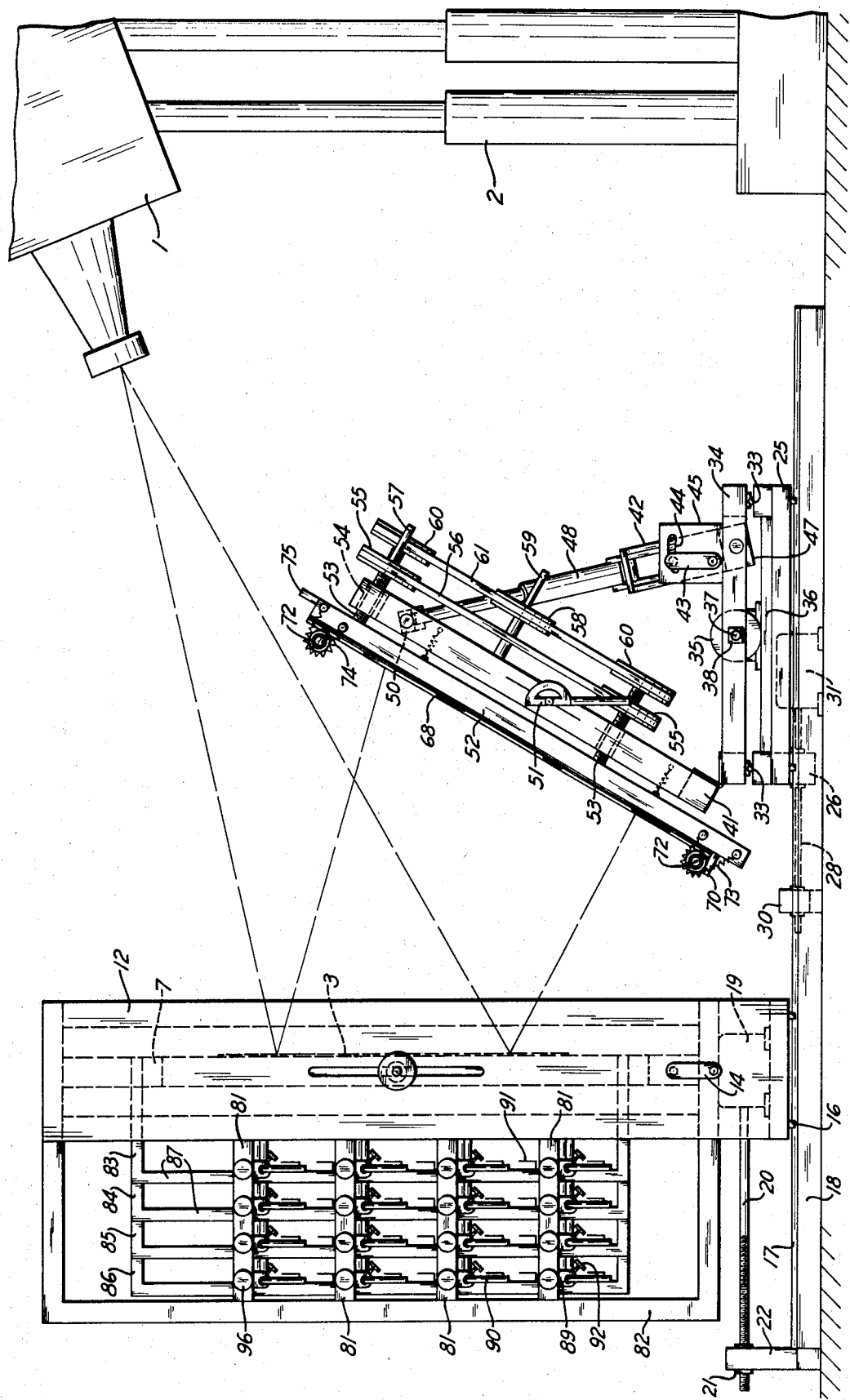
FIG. 1 is a side view of my apparatus.
Figure 2:
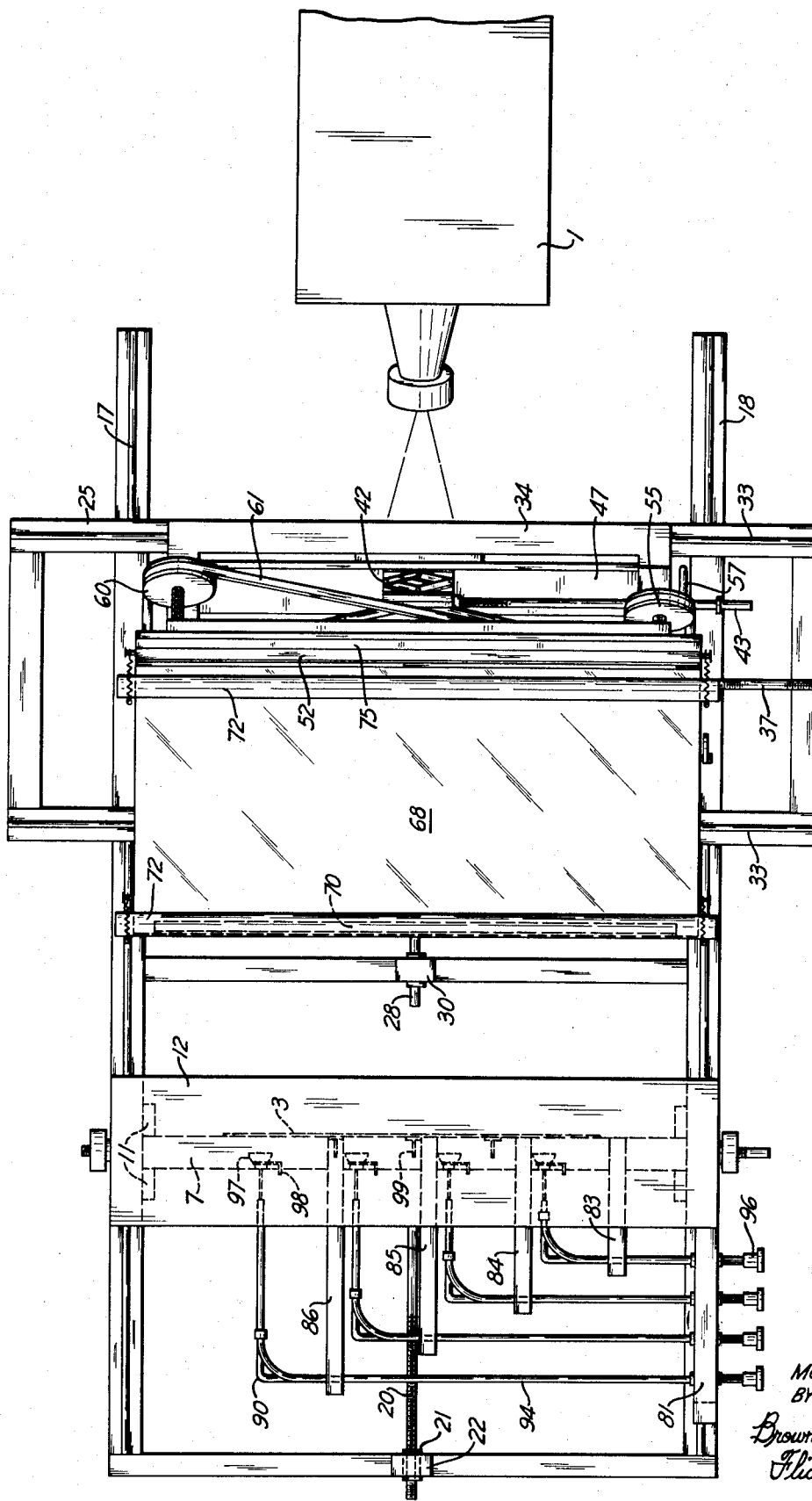
FIG. 2 is a plan view thereof.

Hinged to the front edge of bottom frame 34 is the bottom of an inclined frame 41. This frame is held in adjustable inclined position by vertically adjustable means, such as by a toggle link jack 42 operated by a crank 43 that extends out through an arcuate slot 44 in a block 45 mounted on one side of the bottom frame as shown in FIG. 1. This jack is supported by a cross bar 47 that extends across the bottom frame and is pivotally mounted in its sides near its back. Pivotally connected to the top of the jack are the lower ends of a pair of braces 48 which diverge upwardly and have their upper ends pivoted in brackets 49 fastened to the bottom of another cross bar 50, the ends of which are pivoted in the sides of the inclined frame near its top. By turning the jack crank, the upper end of the inclined frame can be swung up or down to change the inclination of that frame. A weighted protractor 51 can be pivotally suspended from one side of the frame to indicate its angle.

Figure 4:
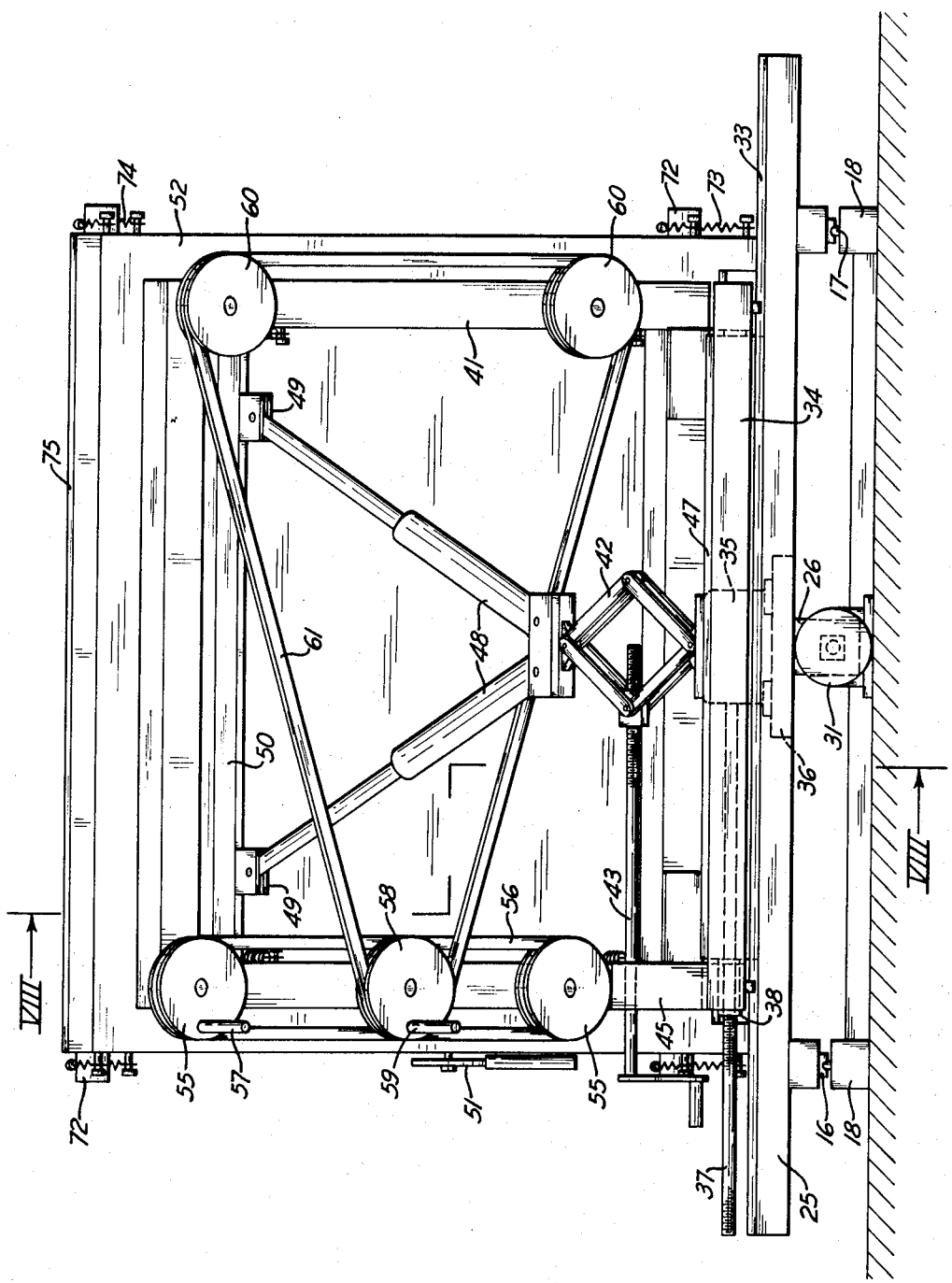
FIG. 4 is a view of the back of the easel.

The inclined frame supports a flat rectangular easel table 52 that is held on the front ends of four screws 53 rotatably mounted in it, but not threaded in it. They are supported by stationary nuts 54 in the sides of the inclined frame. Rigidly mounted on the rear ends of these screws are pulleys, as shown in FIG. 4. At one side of the easel the upper and lower pulleys 55 are connected by a belt 56 and one of them may be provided with a handle 57 for rotating them. Between these two pulleys is a fifth pulley 58 rotatably connected to that side of the inclined frame and preferably provided with a handle 59 for turning it. This pulley and the two pulleys 60 at the opposite side of the frame are surrounded by an endless belt 61. If all of the pulleys are rotated at the same time, the easel table will be moved forward or backward relative to the inclined frame. If only one set of pulleys is rotated, the table will be tilted laterally in one direction or the other relative to the frame.

Covering the front face of the easel table is a relatively thick layer of cloth 65, as shown in FIG. 9, which will compensate for any unevenness of the table surface. This cloth is covered by a layer of soft rubber 66 that forms a resilient cushion. The rubber preferably is covered by a sheet of white paper 67. These three layers are a part of the easel. The purpose of the easel is to form a flat support for a template and later for an unexposed photographic film or paper. The cloth, rubber and white paper are held perfectly flat by a transparent plate 68, such as glass that covers them. The rubber cushion and the cloth make certain that the template or film will be pressed flat against the plate; otherwise, the final photograph would be distorted or not sharp. Instead of the cloth and rubber layers, a cushioning layer of some other resilient material may be used, as long as it insures full and even contact of the film with the glass plate.

The lower edge of the glass plate rests on a shelf 70 extending across the bottom of the easel table. The plate is pressed toward the table by a pair of spring-pressed rolls extending across the glass plate near its upper and lower edges. As shown in FIG. 8, each roll has a rigid core 71 encircled by a soft cushion 72. The lower roll normally rests against the shelf as well as the plate and is pulled tightly against the plate by means of coil springs 73 that are looped around the projecting ends of the roll. The ends of the springs are attached to the sides of the table. The upper roll is likewise held against the glass by coil springs 74, the ends of which are fastened to the sides of the table. To open the easel, the upper roll is lifted or rolled off the upper edge of the plate and onto the top of the table, where it is retained by a stop 75. The top of the plate then can be swung forward, with the bottom roll and springs acting as a flexible hinge. The glass plate can be supported in an over center position by a chain clamped to one end and adjustably connected to the easel table (but omitted from the drawings). Of course, if it is desired to completely remove the plate, the bottom roll can be lifted over shelf 70 and then held against the table below the shelf. This simple compressive type easel serves its purpose as well as the much more expensive vacuum type. A plurality of vertically spaced horizontal bars 81 (FIGS. 1, 2, 3, 6 and 7) extend rearwardly from one side of the mirror framework, with their rear ends connected by a vertical member 82. Also, two rows of horizontally spaced bars 83, 84, 85 and 86 extend rearwardly from the top and bottom of the mirror frame. The rear ends of the bars in the upper row are rigidly connected by vertical bars 87 to those in the lower row. The horizontal bars 83 at one side of the frame are relatively short and the others in the two rows become progressively longer as the other side is approached.

Depending from the bottom of each of the side bars 81 is a row of brackets 89, through which rods 90 extend loosely. The outer ends of the rods are turned downwardly to form handles, while their inner end portions are bent forward at right angles and extend toward the back of the mirror. The rods are supported behind the mirror by vertically spaced hooks 91 projecting toward it from the vertical bars. There are considerably more hooks on each bar than there are rods, so that the inner ends of the rods can be supported at different elevations. Once they are in the desired position, they are held there rigidly by thumb screws 92 threaded in brackets 89 and pressing against the sides of the rods.

These rods support the inner end portions of flexible tubes 94 that extend along the rods and are fastened to them. Their outer ends are mounted in side bars 81 above brackets 89. Slidably mounted in each tube is a wire 95 or the like, on the outer end of which there is a knob 96 for sliding the wire inwardly or outwardly in the tube. The inner end of the wire projects from the tube and carries a distortion member 97, such as a soft rubber cup, which is located close to the back of the mirror. If any one of these cups is moved into engagement with the mirror and then forward it will distort the engaged area of the mirror by causing it to bulge forward slightly. The closer the stretcher clips 4 are together around the mirror, the less likely the distortion of any given area of the mirror is to affect the surrounding area. By sliding the guide rods in or out through their supporting brackets 89, or raising or lowering their inner ends to rest them on different hooks 91, the distortion members can be applied to almost any area of the mirror. ends Prior to use of the apparatus a photograph is taken of the area, terrain or object which is under consideration. After the film has been developed, it is ready for projection in the above-described apparatus. An aerial survey photographs may be referred to as an exemplary example. Several salient points across the field of view are accurately located by physical measurement, field surveys, and the like. A template is then prepared in which the several points are accurately plotted at a convenient scale. The key points may be any obvious topographic feature. They may be isolated trees, streams, lamp posts, curbs, manholes or other points which also appear upon the aerial photograph. For many purposes the key points will be selected wherever a significant break or change in grade occurs. For reasons set forth hereinabove, the aerial photograph will be distorted and the apparent distances between the key points in the photograph will not be to any scale from which true distances between the points may be determined.

The template which has been prepared is placed over the cushioned white paper background of the easel and is held flat by the glass plate pressed against it by the two rollers and their springs. The negative of the aerial photograph is then projected onto mirror 3 and reflected by it onto the easel and onto the template on the easel. The mirror frame is adjusted vertically and horizontally if necessary and the position of the easel also can be adjusted horizontally and laterally, and also twisted or tilted. By appropriate manipulation any distortion present by reason of camera misalignment may be offset and neutralized. The limit of such manipulation usually occurs when some, but not all, points plotted on the template fall directly under the image of them projected from the negative.

In most cases such adjustments of the easel and mirror frame will not fully and adequately compensate for the distortion present in the photograph, notably relief distortion. Thus there is an "interior" distortion within the photograph. Accordingly, after manipulation of the easel and mirror frame, the mirror surface itself is bent out of its plane so as to deform the mirror and distort the image reflected from it. The deforming of the mirror is accomplished by bending different selected areas of the mirror either forward or backward out of the normal vertical plane of the mirror. In some instances, only a localized deformation will be required, and in other instances an area of the mirror will be deformed.

In this manner, the key points may be projected from the photographic negative to precisely overlay and register with the location of those key points on the template.

After appropriate correction of the photograph, the projector is turned off, the top of the glass plate is swung away from the easel, and an unexposed sheet of photographic film 100 (FIG. 9) is either laid over the template or put in its place. Transparent photographic film is normally placed in the easel since an infinite number of scaled photographic reproduction may be produced from it. If a print only is desired, an opaque film or paper may be placed in the easel. If desired, the film may be covered or partly covered by a magenta screen 101 provided with a great many tiny dots to prepare the picture for regular engineering or architectural printing machinery. Also, a special negative 102 may be placed around the magenta screen to add data to the picture. Such data may be a title block, guide lines for later adding a profile of the photographed area to the picture, etc. After the glass plate has been clamped back onto the easel, the projector is turned on just long enough to expose the film to the corrected image of the survey, and then the film can be developed and printed in the usual way.

If it is found that negative 102 requires less exposure than the picture, a previously made mask that will fit over the data on the negative can be placed against the glass plate while exposure is taking place. The mask stops exposure of the negative data but does not interfere with continued longer exposure of the picture area. This technique allows multiple exposure to be accomplished in a single operation, thereby saving time and providing the best overall exposure. Also, by placing the film on the easel with its emulsion side toward the easel, a positive transparency or engineering tracing can be produced, which later can be drafted upon, revised or corrected without disturbing or marring the picture.

The usefulness of the invention may be seen by reference to a specific example. A sewer line was to be placed along a substantially straight street. The distance between key points at the ends of a selected run of sewer was 1147 feet. Those two key points and four intermediate points were located by on-site measurement and a template prepared to scale. An aerial photograph was taken of the same area. The photograph was then projected from the negative into the template in the conventional manner and adjusted so that the two end points on the photograph exactly coincided with the two end points on the template. There was no deformation of the mirror. By scaling the photograph it was found that the four intermediate key points on the photograph were displaced from the actual location by distances 26, 28, 18, and 14 feet. Such distances are too great to be tolerated in engineering work. As a result a direct aerial photograph can do little more than indicate the general nature of the area. Accordingly full field work and mapping is necessary. When the instant invention is employed, however, a photograph to scale may be obtained. Only minimum field work is required, and the amount of office time is vastly reduced. Moreover, a full representation appears by photograph without any omissions which would occur in mapping. Thus, the detail is far greater than can be obtained by a field survey.

I claim:

1. The method of making an aerial survey photograph of a geographical area to scale, comprising plotting on a template at a given scale the correct relative locations of key points in said area, projecting an image of an out of scale aerial survey photograph of said area showing said key points onto a flexible reflective surface that reflects said image onto the template, manipulating said surface to register said key points of said image with the corresponding key points on the template, stopping said projection, placing an unexposed photographic film at the template location, resuming said projection onto said reflective surface to reflect said image onto the film to expose it, and processing the exposed film to produce a picture at the same scale as the template.

2. A method according to claim 1, in which said reflective surface is manipulated by deforming portions of it out of its plane to change the distance between said key points of the image on the template.

3. Apparatus for use with a photographic projector for making an aerial survey photograph of a geographic area to scale, comprising a template representing said geographic area at a given scale and including key points of said area in correct relative locations thereon, a normally flat flexible mirror for reflecting onto said template the projected image of an out of scale aerial survey photograph of said area showing said key points, an easel for supporting said template relative to said mirror to receive a projected image of said photograph as reflected by said mirror, and means for deforming selected areas of the mirror to cause the projected image key points to register with the corresponding template key points.

4. Apparatus according to claim 3, including means for adjusting the mirror in different directions in its plane.

5. Apparatus according to claim 3, including means for adjusting the mirror toward and away from said easel.

6. Apparatus according to claim 3, including means for adjusting the angle of said easel relative to the mirror.

7. Apparatus according to claim 3, in which said mirror-deforming means include a plurality of laterally spaced distortion members behind the mirror, and means for moving said members independently of one another in a direction perpendicular to the mirror to bend engaged areas of the mirror out of the plane of the mirror.

8. Apparatus according to claim 7, in which said member-moving means include tubes, means supporting the tubes, wires extending through the tubes and joined to said members, and means for moving the wires back and forth in the tubes.

9. Apparatus according to claim 7, in which said member-moving means include tubes extending rearwardly away from the mirror and then laterally, flexible wires extending though the tubes and joined to said members, means for moving the wires back and forth in the tube, guide rods secured to the tubes and extending laterally therewith, and means for supporting the rods in different positions to permit said distortion members to be adjusted in a plane parallel to the mirror.

10. Apparatus according to claim 3, in which said easel includes a flat table, a flat cushion of resilient material mounted on the table, a glass plate covering said sheet, and means normally pressing the said plate toward said cushion.

11. Apparatus according to claim 10, including a base, a frame behind the table hinged at one edge to said base, means carried by the frame supporting the table, and means for adjusting said last-mentioned means relative to the frame to adjust the angle of the table relative to the frame.

12. Apparatus according to claim 10, in which said plate-pressing means include cross members extending across said glass plate near two opposite edges and projecting endwise beyond the plate, and flexible resilient members looped around the projecting ends of the cross members and secured to the table for pulling the plate toward the table, one of said cross members being movable away from the plate to release the adjoining edge of the glass plate, so that it can be swung away from said cushion to permit a template or film to be inserted between the plate and cushion.

13. The method of making precision photogrammetric representations of terrain, structures, and the like which comprises locating by measurement key points within the area to be represented photographically, preparing a template upon which said key points are located with precision, placing the template upon a holder, projecting an image from a photograph of the area onto a reflective surface from which the image is reflected to the template and selectively deforming the reflective surface whereby distortions inherent in the photograph are corrected and the key points projected from the photograph are caused to overlie the same key points on the template.

14. The method of claim 13 in which the photograph is projected onto a flat surface, the alignment of the projector and flat surface are relatively adjusted, and the reflecting surface is thereafter deformed.

15. The method of claim 13 in which a sheet of photographic material is placed in the plane of the template and exposed to form a corrected and scaled photographic representation.

16. The method of making precision photogrammetric representations of terrain, structures and the like which comprises locating by measurement key points within the area to be represented photographically, preparing a template upon which said key points are located with precision, locating the template upon a holder, projecting the photograph onto the template, and selectively distorting the photographic image to correct for distortion and displacement in the photograph whereby the key points projected from the photograph are caused to overlie the same key points on the template.

17. The method of claim 16 in which a sheet of photographic material is exposed to the corrected scaled representation.

* * * * *